UNITED STATES PATENT OFFICE.

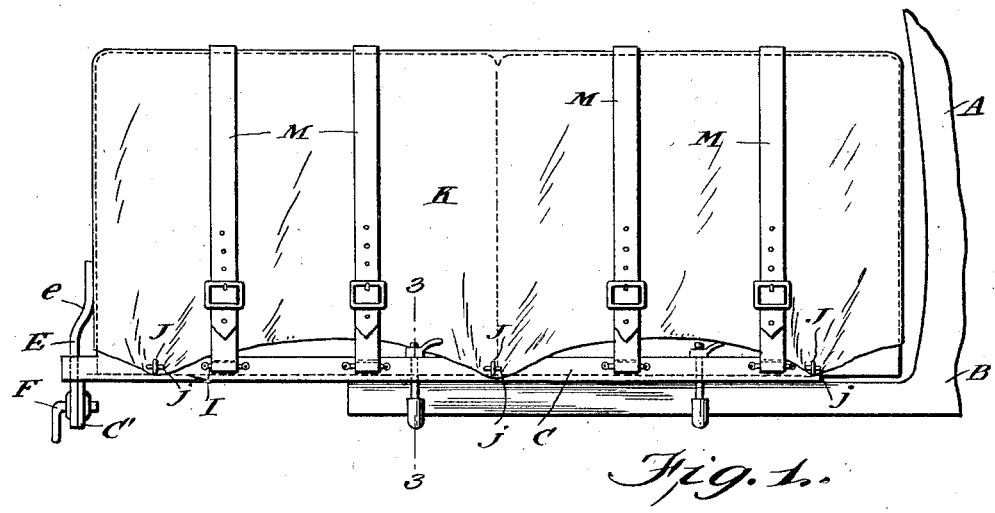
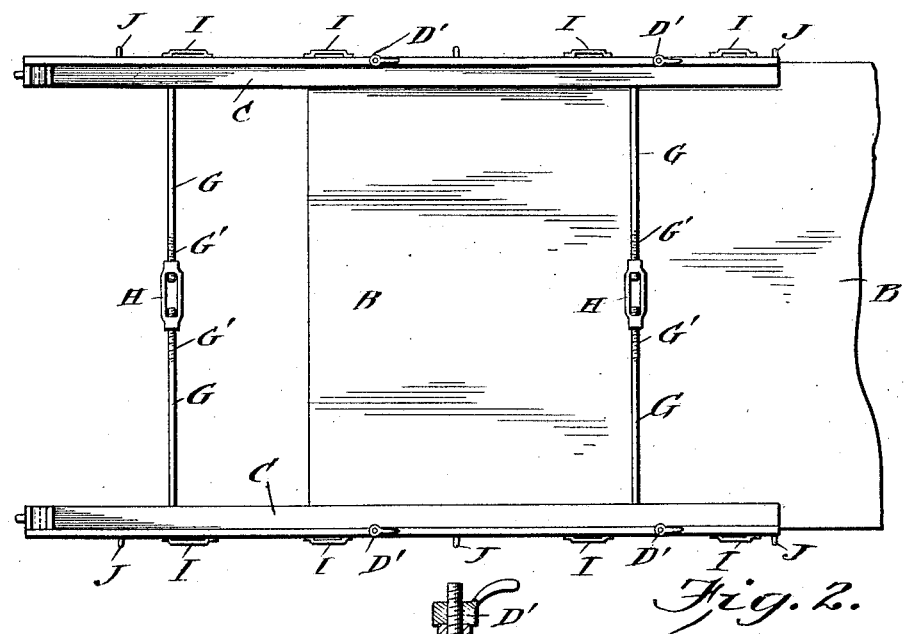
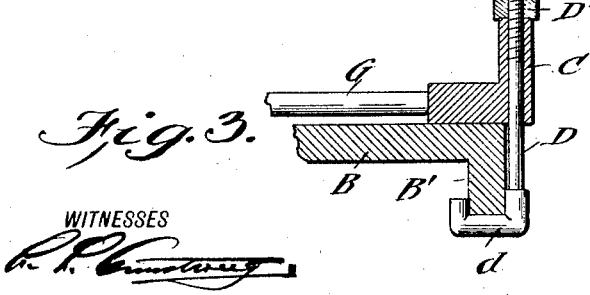

WILLIS K. YOST, OF LITTLE ROCK, ARKANSAS.

LOAD-CARRIER FOR AUTOMOBILES.

1,346,581. Specification of Letters Patent. Patented July 13, 1920.

Application filed May 8, 1919. Serial No. 295,668.

*To all whom it may concern:*

Be it known that I, WILLIS K. YOST, a citizen of the United States, and a resident of Little Rock, in the county of Pulaski and State of Arkansas, have invented certain new and useful Improvements in Load-Carriers for Automobiles, of which the following is a specification.

My invention relates to improvements in luggage load carriers which, while they may be of general application, are more particularly intended for use as an attachment for a roadster with flat body extension.

An object of my invention is to provide means for carrying sample trunks or other loads at the rear of the tonneau or body of an automobile.

A further object is to provide an attachment for carrying extra loads at the rear of an automobile that can be quickly applied or removed, and which can be collapsed or folded into a small space for storage or transport.

With these and other objects in view my invention consists in certain novel features of construction, arrangement and combination of parts as will be hereinafter fully described and pointed out in the claims reference being had to the accompanying drawings in which:—

Figure 1 is a side elevation showing a portion of the rear end of an automobile with my improvements applied and supporting a trunk or sample case and cover therefor.

Fig. 2 is a top plan view with the trunk and cover removed.

Fig. 3 is an enlarged detail sectional view showing means of securing the carrier to an automobile frame.

Referring more specifically to the drawings, A designates the rear end of an automobile which has a flat body extension B, and the downwardly extending flanges $B^1$ at each side as indicated in Fig. 3.

The carrier or attachment comprises two bars or L beams C with the angles facing inwardly or opposing. These side bars are intended to rest on the frame B at each side of the same—and are rigidly held thereon by hook bolts D which pass through the vertical wall of the L beams C; these hook bolts are mounted in the L beams at suitable intervals and the lower hook ends are square and covered with rubber tubing $d$ so that they will not scar or mar the frame when tightly clamped thereon. These hooks engage the lower edge of the flanges $B^1$ and are drawn into tight contact therewith by wing or handled nuts $D^1$ screwing on the upper threaded ends of the bolts and against the upper edge of the L-beams C.

The horizontal members of the L beam at their outer ends are severed from the vertical member and bent downwardly to form brackets $C^1$ which are provided with threaded perforations, and to these brackets are secured upwardly projecting end stops E, the stops having their upper portion offset at $e$ and lying forward of the lower portion; the lower ends of the stops are also provided with threaded perforations, these perforations being alined with the threaded perforations in the brackets $C^1$ and a crank bolt F threaded through the alined perforations of the brackets $C^1$ and the stop E.

The side beams where they overlie the frame or body and beyond the automobile frame or body are connected with each other by a turn buckle structure, the rods G passing through the side beams with their reversely threaded inner ends $G^1$ projecting toward each other in alinement and connected by the buckle nut H the ends of which are of course reversely threaded. By this construction the side beams may be spaced from each other to varying degrees so that the carrier may be adapted to different widths of automobile bodies.

At suitable intervals on the outer face of the vertical members of the side L-beams C, strap loops I are secured, and at suitable intervals between the strap loops and beyond them at each end may be placed carriage curtain fasteners J, which may be of the turn button type or otherwise.

As indicated in Fig. 1 a trunk or sample case, (indicated in dotted lines) is slid onto the carrier, the L shape of the side beams facilitating this, a weather protective cover K is placed over the trunk, said cover being provided with openings or eyelets $j$ which are associated with the carriage curtain fasteners J; straps M are then passed over the cover and passing through the strap loops I are drawn tightly and buckled, and the straps thus tightly drawn, aid in holding the trunk in place and prevent it being jolted upwardly and off the frame.

The rear end stops by being offset inwardly maintain the trunk well within the rear end of the carrier, and prevent the trunk slipping off rearwardly and prevent injury thereto by collision in the rear.

The whole device can be quickly disassembled, as the turnbuckle bars are removably held in the side beams and the central connecting nuts can be easily screwed off one of the bars of each set; the two side beams can then be brought together and nested and wrapped with the cover so that the carrier can be stowed away in the automobile to which it is attached, or elsewhere.

If desired the carrier may be left attached to the automobile after being once applied, and the cover used for protecting the device from the elements.

The frame constructed as herein set forth can be made very light, as light iron side bars can be used which will insure sufficient strength to permit attachment of the various elements.

The manner of using the device when attached to an automobile is as follows:—

The stops E are loosened and swung downwardly; the trunk is then slid onto the frame the side bars constituting tracks or guideways, the trunk being slid inwardly until it clears the rear ends of the guides; the stops are then swung upwardly on the tracks and clamped in position directly at the rear end of the tracks; the cover, if desired is then put over the trunk and the strap and carriage curtain fasteners tightened.

I claim:

1. The device as herein characterized and comprising oppositely facing L side beams spaced apart, laterally adjustable, and detachably connected together, hook bolts adjustably mounted in said beams and adapted for engagement with the frame of an automobile, rigid brackets extending downwardly from said beams at the rear ends thereof, and stops pivotally mounted at their lower ends on said brackets below the plane of said side beams, said stops adapted to be swung upwardly and against the side walls of the L beams, and means for locking said stops in such position.

2. The device as herein characterized and consisting of a pair of oppositely facing side L beams, turnbuckles removably carried by said side beams and adjustably connecting the same in spaced relation, the rear ends of the beams carrying integral downwardly projecting threaded brackets, vertically projecting stop bars also threaded and detachably connected to said brackets, hook bolts carried by said beams and adapted to engage the lower face of an automobile frame, and means carried on the upper ends of said hook bolts and adapted to engage the side beams to hold the side bars to the automobile frame.

WILLIS K. YOST.

Witnesses:
C. M. SUTTON,
J. L. MARTIN.